United States Patent [19]

Gottschalk et al.

[11] Patent Number: 5,728,800
[45] Date of Patent: Mar. 17, 1998

[54] THERMOPLASTIC POLYAMIDE MOLDING MATERIALS

[75] Inventors: Axel Gottschalk, Neustadt; Herbert Fisch, Wachenheim; Gunter Pipper, Bad Dürkheim; Martin Weber, Neustadt, all of Germany

[73] Assignee: BASF Aktiengesellschaft, Ludwigshafen, Germany

[21] Appl. No.: 590,472

[22] Filed: Jan. 23, 1996

[30] Foreign Application Priority Data

Jan. 24, 1995 [DE] Germany .......................... 195 01 998.9

[51] Int. Cl.$^6$ .......................... C08G 69/26; C08L 77/60
[52] U.S. Cl. .......................... 528/310; 528/322; 528/323; 528/325; 528/338; 528/345; 522/164
[58] Field of Search .......................... 528/345, 310, 528/325, 323, 338, 322; 522/164

[56] References Cited

U.S. PATENT DOCUMENTS

| 3,597,400 | 8/1971 | Kashiro et al. ............ 528/339 |
| 3,769,771 | 11/1973 | Owens et al. ............ 525/111 |
| 4,496,690 | 1/1985 | Grant et al. ............ 525/66 |
| 5,032,644 | 7/1991 | Biletch et al. ............ 525/66 |
| 5,132,370 | 7/1992 | Grant et al. . |
| 5,177,177 | 1/1993 | Thullen et al. ............ 528/339.3 |
| 5,326,850 | 7/1994 | Goetz et al. ............ 528/345 |
| 5,359,013 | 10/1994 | Mason et al. ............ 535/432 |
| 5,482,998 | 1/1996 | Muehlbach et al. ............ 525/66 |

FOREIGN PATENT DOCUMENTS

| 1 245 | 4/1979 | European Pat. Off. . |
| 3 126 | 7/1979 | European Pat. Off. . |
| 322 558 | 7/1989 | European Pat. Off. . |
| 345 486 | 12/1989 | European Pat. Off. . |
| 411 823 | 2/1991 | European Pat. Off. . |
| 34 03 576 | 8/1985 | Germany . |
| 2194540 | 3/1988 | United Kingdom . |
| 89/01962 | 3/1989 | WIPO . |

OTHER PUBLICATIONS

Japanese Abstracts 41/26757 Sep. 18, 1990.

Primary Examiner—P. Hampton-Hightower
Attorney, Agent, or Firm—Keil & Weinkauf

[57] ABSTRACT

Thermoplastic molding materials contain

A) from 5 to 94% by weight of a partly aromatic, semicrystalline copolyamide composed essentially of
   $a_1$) from 30 to 44 mol % of units which are derived from terephthalic acid,
   $a_2$) from 6 to 20 mol % of units which are derived from isophthalic acid,
   $a_3$) from 43 to 49.5 mol % of units which are derived from hexamethylenediamine, and
   $a_4$) from 0.5 to 7 mol % of units which are derived from aliphatic cyclic diamines of 6 to 30 carbon atoms,
   the molar percentages of components $a_1$) to $a_4$) together giving 100% and B) from 5 to 94% by weight of an ASA or ABS or SAN polymer or of a $C_1$–$C_{18}$-alkyl ester of (meth)acrylic acid or of a mixture thereof, C) from 1 to 30% by weight of an adhesion promoter which contains from 0.1 to 10% by weight, based on 100% by weight of (C), of functional monomers, D) from 0 to 30% by weight of an elastomeric polymer, E) from 0 to 45% by weight of a fibrous or particulate filler or of a mixture thereof, and F) from 0 to 30% by weight of conventional additives and processing assistants, the percentages A) to F) summing to 100%.

8 Claims, No Drawings

THERMOPLASTIC POLYAMIDE MOLDING MATERIALS

BACKGROUND OF THE INVENTION

1. Field of the Invention

The present invention relates to thermoplastic molding materials comprising

A) from 5 to 94% by weight of a partly aromatic, semicrystalline copolyamide composed essentially of
  $a_1$) from 30 to 44 mol % of units which are derived from terephthalic acid,
  $a_2$) from 6 to 20 mol % of units which are derived from isophthalic acid,
  $a_3$) from 43 to 49.5 mol % of units which are derived from hexamethylenediamine, and
  $a_4$) from 0.5 to 7 mol % of units which are derived from aliphatic cyclic diamines of 6 to 30 carbon atoms,
the molar percentages of components $a_1$) to $a_4$) together giving 100% and B) from 5 to 94% by weight of an ASA or ABS or SAN polymer or of a $C_1$–$C_{18}$-alkyl ester of (meth)acrylic acid or of a mixture thereof, C) from 1 to 30% by weight of an adhesion promoter which contains from 0.1 to 10% by weight, based on 100% by weight of (C), of functional monomers, D) from 0 to 30% by weight of an elastomeric polymer, E) from 0 to 45% by weight of a fibrous or particulate filler or of a mixture thereof, and F) from 0 to 30% by weight of conventional additives and processing assistants, the percentages A) to F) summing to 100%.

The present invention furthermore relates to the use of the thermoplastic molding materials for the production of fibers, films and moldings, and to the moldings obtainable thereby.

2. Description of the Related Art

Blends of polyamides with SAN, ABS or ASA polymers are generally known. In general ABS is incorporated as a toughener into polyamide, as described, inter alia, in EP-A 3126, DE-A 34 03 576, EP-A 322 558, EP-A 411 823 and EP-A 1245.

However, ABS, ASA, SAN or PMMA polymers are incompatible with polyamide, resulting in insufficient interphase adhesion, which often leads to separation of the polymers during processing.

In order to achieve better interphase adhesion, it is furthermore known that one of the two polymers can be modified, ie. functional monomers can be introduced in the polymer chain by copolymerization or grafting. These groups can react with the other polymers in each case during processing of the blends and can improve the interphase adhesion.

JP-A 041 126 757 and WO-A 89 1962 describe carboxyl-modified ABS and polyamide, prepared in the presence or absence of a free radical initiator. U.S. Pat. No. 4,496,690 discloses ABS modified by acrylamide as a blend with polyamides. U.S. Pat. No. 5,032,644 discloses isocyanate-containing styrenes for modifying ABS for polymer blends, and U.S. Pat. No. 5,132,370 discloses (N-phenyl) maleimide-containing ABS for polyamide blends. U.S. Pat. No. 3,796,771 describes polyamides modified with acidic groups, as a blend with ABS.

The ABS/polyamide blends which are known from the prior art are, however, still worthy of improvement with regard to the interphase adhesion and the mechanical properties of the moldings.

Particularly in the case of complicated geometries of moldings, the joint line strength is unsatisfactory. These joint lines are formed at the interphases of the polymer melts which, in the case of complex three-dimensional shapes of the injection mold, have to be injected at various points on the mold in order completely to fill the part of the mold.

SUMMARY OF THE INVENTION

It is an object of the present invention to provide thermoplastic molding materials which are based on polyamides and ABS, SAN, ASA or (meth)acrylate polymers and have good joint line strength in addition to good toughness (in particular multiaxial impact strength).

We have found that this object is achieved according to the invention, by the thermoplastic materials defined at the outset. Preferred materials of this type are described in the subclaims.

DESCRIPTION OF THE PREFERRED EMBODIMENTS

The novel molding materials contain, as component A), a partly aromatic semicrystalline copolyamide in an amount of from 5 to 94, preferably from 10 to 95, in particular from 20 to 80, % by weight, composed of $a_1$) from 30 to 44, preferably from 32 to 40, in particular from 32 to 38, mol % of units which are derived from terephthalic acid, $a_2$) from 6 to 20, preferably from 10 to 18, in particular from 12 to 18, mol % of units which are derived from isophthalic acid, $a_3$) from 43 to 49.5, preferably from 46 to 48.5, in particular from 46.3 to 48.2, mol % of units which are derived from hexamethylenediamine and $a_4$) from 0.5 to 7, preferably from 1.5 to 4, in particular from 1.8 to 3.7, mol % of units which are derived from aliphatic cyclic diamines of 6 to 30, preferably 13 to 29, in particular 13 to 17, carbon atoms, the molar percentages of components $a_1$) to a4) together giving 100%.

The diamine units $a_3$) and $a_4$) are preferably reacted in equimolar amounts with the dicarboxylic acid units $a_1$) and $a_2$).

Suitable monomers $a_4$) are preferably cyclic diamines of the formula

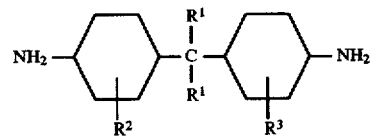

where $R^1$ is hydrogen or $C_1$–$C_4$-alkyl and $R^2$ and $R^3$ are each $C_1$–$C_4$-alkyl or hydrogen.

Particularly preferred diamines $a_4$) are bis(4-aminocyclohexyl)methane, bis(4-amino-3-methylcyclohexyl)methane, 2,2-bis(4-aminocyclohexyl)propane and 2,2-bis(4-amino-3-methylcyclohexyl)propane.

Examples of further monomers $a_4$) are 1,3- and 1,4-cyclohexanediamine and isophoronediamine.

In addition to the units $a_1$) to $a_4$) described above, the partly aromatic copolyamides A) may contain up to 4, preferably up to 3.5, % by weight (based on 100% by weight of A) of further polyamide-forming monomers $a_5$), as known for other polyamides.

Aromatic dicarboxylic acids $a_5$) are of 8 to 16 carbon atoms. Suitable aromatic dicarboxylic acids are, for example, substituted terephthalic and isophthalic acids, such as 3-tert-butylisophthalic acid, polynuclear dicarboxylic acids, eg. 4,4'- and 3,3'-biphenyldicarboxylic acid, 4,4'- and 3,3'-diphenylmethanedicarboxylic acid, 4,4'- and 3,3'-dicarboxydiphenyl sulfone, 1,4-and 2,6-naphthalenedicarboxylic acid and phenoxyterephthalic acid.

Further polyamide-forming monomers as) may be derived from dicarboxylic acids of 4 to 16 carbon atoms and aliphatic diamines of 4 to 16 carbon atoms and from aminocarboxylic acids or corresponding lactams of 7 to 12 carbon atoms. Examples are suberic acid, azeleic acid or sebacic acid, as typical aliphatic dicarboxylic acids, 1,4-butanediamine, 1,5-pentanediamine and piperazine, as typical diamines, and caprolactam, capryllactam, enantholactam, ω-aminoundecanoic acid and laurolactam, as typical lactams and aminocarboxylic acids, to mention but a few suitable monomers of these types.

Other partly aromatic copolyamides which have proven particularly advantageous are-those whose triamine content is less than 0.5, preferably less than 0.3, % by weight.

Partly aromatic copolyamides prepared by most known processes (cf. U.S. Pat. No. 4 603 166) have triamine contents which are more than 0.5% by weight, leading to a deterioration in the product quality and to problems in the continuous preparation. An example of a triamine which causes these problems is in particular dihexamethylenetriamine, which forms from the hexamethylenediamine used in the preparation.

At a given solution viscosity, copolyamides having a low triamine content have lower melt viscosities than products of the same composition which have a higher triamine content. This considerably improves both the processability and the product properties.

The melting points of the partly aromatic copolyamides are from 290° to 340° C., preferably from 292° to 330° C., this melting point being associated with a high glass transition temperature of, as a rule, more than 120° C., in particular more than 130° C. (in the dry state).

According to the invention, the partly aromatic copolyamides are to be understood as meaning those which have a crystallinity of >30%, preferably>35%, in particular>40%.

The crystallinity is a measure of the proportion of crystalline fragments in the copolyamide and is determined by X-ray diffraction or indirectly by measuring $\Delta H_{cryst}$ Mixtures of the partly aromatic copolyamides can of course also be reacted, any desired mixing ratio being possible.

Suitable processes for the preparation of the novel copolyamides are known to a person skilled in the art.

A preferred preparation method is the batch process. Here, the aqueous monomer solution is heated in an autoclave to 280°–340° C. in the course of from 0.5 to 3 hours, a pressure of 10–50, in particular 15–40, bar being reached and being kept constant for up to 2 hours by releasing excess steam. The autoclave is then let down at constant temperature in the course of 0.5–2 hours until a final pressure of from 1 to 5 bar has been reached. The polymer melt is then discharged, cooled and granulated.

Another preferred-process is carried out similarly to the processes described in EP-A 129 195 and 129 196.

In these processes, an aqueous solution of the monomers $a_1$) to $a_4$) and, if required, $a_5$), having a monomer content of from 30 to 70, preferably from 40 to 65, % by weight, is heated to 280°–330° C. in the course of less than 60 seconds under superatmospheric pressure (from 1 to 10 bar) and with simultaneous evaporation of water and formation of a prepolymer, after which prepolymer and vapor are continuously separated, the vapor is rectified and the entrained diamines are recycled. Finally, the prepolymer is passed into a polycondensation zone and subjected to polycondensation at a superatmospheric pressure of from 1 to 10 bar and from 280° to 330° C. during a residence time of 5–30 minutes. Of course, the temperature in the reactor is above the melting point of the resulting prepolymer which is required at the particular steam pressure.

The formation of triamines is substantially prevented by these short residence times.

The resulting polyamide prepolymer, which as a rule has a viscosity number of from 40 to 70, preferably from 40 to 60, ml/g, measured in a 0.5% strength by weight solution in 96% strength sulfuric acid at 25° C., is removed continuously from the condensation zone.

In a preferred procedure, the polyamide prepolymer thus obtained is passed in molten form through a discharge zone with simultaneous removal of the residual water present in the melt. Examples of suitable discharge zones are devolatilization extruders. The melt freed from water in this manner is then extruded and the extrudate is granulated.

In a particularly preferred embodiment, it is also possible to add the components B) and C) and, if required, D) to F) to the prepolymer of component A) in the devolatilization extruder itself, in which case the devolatilization extruder is usually equipped with suitable mixing elements, such as kneading blocks. The product is then likewise extruded and the extrudate is cooled and granulated.

These granules are subjected to continuous or batchwise solid-phase condensation under inert gas at below the melting point, for example at from 170° to 240° C., until the desired viscosity is obtained. For example, tumbler dryers may be used for the batch-wise solid-phase condensation, and the continuous solid-phase condensation may be carried out using heating tubes through which hot inert gas flows. The continuous solid-phase condensation is preferred, the inert gas used being nitrogen or in particular superheated steam, advantageously the steam obtained at the top of the column.

After the solid-phase postcondensation or the other above-mentioned preparation processes, the viscosity number is in general from 100 to 500, preferably from 110 to 200, ml/g, measured in a 0.5% strength by weight solution in 96% strength sulfuric acid at 25° C. The novel molding materials contain, as polymer B), from 5 to 94, preferably from 5 to 60, in particular from 10 to 50, % by weight of an ASA or ABS or SAN polymer or of a polymer of $C_1-C_{18}$-alkyl esters of (meth)acrylic acid or blends of such polymers.

The mixing ratio of the polymers may be varied within wide limits; however, where (meth)acrylates are mixed with ASA, ABS or SAN, it should be noted that these are miscible only to an acrylonitrile content of up to 27% by weight (up to 250° C., based on the processing temperature), and up to 25% by weight (up to 300° C.), based on the total content of, for example, ABS.

The preferred ASA polymers are composed of a soft or rubber phase comprising a graft polymer of:

$B_1$ from 50 to 90% by weight of a grafting base based on
   $B_{11}$ from 95 to 99.9% by weight of a $C_2-C_{10}$-alkyl acrylate and
   $B_{12}$ from 0.1 to 5% by weight of a difunctional monomer having two olefinic, nonconjugated double bonds and $B_2$ from 10 to 50% by weight of a grafting base comprising $B_{21}$ from 20 to 50% by weight of styrene or a substituted styrene of the general formula I or of a mixture thereof and $B_{22}$ from 10 to 80% by weight of acrylonitrile, methacrylonitrile, acrylates or methacrylates or of a mixture thereof, as a mixture with a hard matrix based on an SAN copolymer $B_3$) of:

$B_{31}$ from 50 to 90, preferably from 55 to 90, in particular from 65 to 85, % by weight of styrene and/or a substituted styrene of the general formula I and $B_{32}$ from 10 to 50, preferably from 10 to 45, in particular from 15 to 35, % by weight of acrylonitrile and/or methacrylonitrile.

The component $B_1$) is an elastomer which has a glass transition temperature of less than $-20°$ C., in particular less than $-30°$ C.

Esters of acrylic acid of 2 to 10, in particular 4 to 8, carbon atoms are used as main monomers $B_{11}$) for the preparation of the elastomer. Particularly preferred monomers here are tert-butyl, isobutyl and n-butyl acrylate and 2-ethylhexyl acrylate, among which the two last-mentioned ones are particularly preferred.

In addition to these esters of acrylic acid, from 0.1 to 5, in particular from 1 to 4, % by weight, based on the total weight $B_{11}+B_{12}$, of a polyfunctional monomer having at least two olefinic, nonconjugated double bonds are used. Among these, difunctional compounds, ie. those having two nonconjugated double bonds, are preferably used. Examples of these are divinylbenzene, divinyl fumarate, diallyl phthalate, triallyl cyanurate, triallyl isocyanurate, tricyclodecenyl acrylate and dihydrodicyclopentadienyl acrylate, among which the two last-mentioned ones are particularly preferred.

Processes for the preparation of the grafting base $B_1$ are known per se and are described, for example, in DE-B 1 260 135. Corresponding products are also commercially available.

Preparation by emulsion polymerization has proven particularly advantageous in some cases.

The exact polymerization conditions, in particular the type, metering and amount of the emulsifier, are preferably chosen so that the latex of the acrylate, which is at least partially crosslinked, has a weight average particle size ($d_{50}$) of from about 200 to 700 nm, in particular from 250 to 600 nm. The latex preferably has a narrow particle size distribution, ie. the quotient $$Q = \frac{d_{90} - d_{10}}{d_{50}}$$

is preferably less than 0.5, in particular less than 0.35.

The proportion of grafting base B1 in the graft polymer $B_1+B_2$ is from 50 to 90, preferably from 55 to 85, in particular from 60 to 80, % by weight, based on the total weight of $B_1+B_2$.

A graft shell $B_2$ which is obtainable by copolymerization of $B_{21}$ from 20 to 90, preferably from 30 to 90, in particular from 30 to 80, % by weight of styrene or a substituted styrene of the general formula I

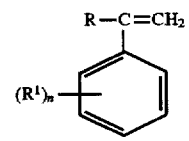

where R is alkyl of 1 to 8 carbon atoms, hydrogen or halogen, $R^1$ is alkyl of 1 to 8 carbon atoms, or halogen, and n is 0, 1, 2 or 3, and $B_{22}$ from 10 to 80, preferably from 10 to 70, in particular from 20 to 70, % by weight of acrylonitrile, methacrylonitrile, acrylates or methacrylates or a mixture thereof is grafted onto the grafting base $B_1$.

Examples of substituted styrenes are α-methylstyrene, p-methylstyrene, p-chlorostyrene and p-chloro-α-methylstyrene, among which styrene and α-methylstyrene are preferred.

Preferred acrylates and methacrylates are those whose homopolymers or copolymers with the other monomers of component $B_{22}$) have glass transition temperatures of more than $20°$ C.; in principle, however, it is also possible to use other acrylates, preferably in amounts such that the resulting overall glass transition temperature $T_g$ for component $B_2$ is above $20°$ C.

Esters of acrylic or methacrylic acid with $C_1$–$C_8$-alcohols and epoxy-containing esters, such as glycidyl acrylate or glycidyl methacrylate, are particularly preferred. Very particularly preferred examples are methyl methacrylate, tert-butyl methacrylate, glycidyl methacrylate and n-butyl acrylate, the last-mentioned one being used, preferably in not too large an amount, owing to its property of forming polymers having a very low $T_g$.

The graft shell $B_2$) may be prepared in one or more, for example two or three, process steps, the overall composition remaining unaffected by this.

The graft shell is preferably prepared in emulsion, as described, for example, in German Patent 1,260,135 and German Laid-Open Applications DOS 3,227,555, DOS 3,149,357 and DOS 3,414,118.

Depending on the conditions chosen, a certain amount of free copolymers of styrene or substituted styrene derivatives and (meth)acrylonitrile or (meth)acrylates is formed in the graft copolymerization.

The graft copolymers $B_1+B_2$ generally have an average particle size of from 100 to 1000 nm, in particular from 200 to 700 nm ($d_{50}$ weight average). The conditions in the preparation of the elastomer $B_1$) and in the grafting are therefore preferably chosen so that particle sizes in this range result. The relevant measures are known and are described, for example, in German Patent 1,260,135, German Laid-Open Application DOS 2,826,925 and J. Appl. Poly. Sci. 9 (1965), 2929–2938. The particle size of the latex of the elastomer can be increased, for example, by means of agglomeration.

For the purposes of the present invention, the graft polymer ($B_1+B_2$) also includes the free, ungrafted homo- and copolymers formed in the graft copolymerization for the preparation of component $B_2$).

Some preferred graft polymers are stated below:

1: 60% by weight of grafting base $B_1$ comprising $B_{11}$ 98% by weight of n-butyl acrylate and $B_{12}$ 2% by weight of dihydrodicyclopentadienyl acrylate and 40% by weight of graft shell $B_2$ comprising $B_{21}$ 75% by weight of styrene and $B_{22}$ 25% by weight of acrylonitrile 2: Grafting base as for 1 with 5% by weight of a first graft shell comprising styrene and 35% by weight of a second graft shell comprising $B_{21}$ 75% by weight of styrene and $B_{22}$ 25% by weight of acrylonitrile 3: Grafting base as for 1 with 13% by weight of a first graft comprising styrene and 27% by weight of a second graft comprising styrene and acrylonitrile in a weight ratio of 3:1

The products contained as component $B_3$) can be prepared, for example, by the process described in German Published Applications DAS 1,001,001 and DAS 1,003,436. Such copolymers are also commercially available. The weight average molecular weight determined by light scattering is preferably from 50,000 to 500,000, in particular from 100,000 to 250,000.

The weight ratio $(B_1+B_2):B_3$ is from 1:2.5 to 2.5:1, preferably from 1:2 to 2:1, in particular from 1:1.5 to 1.5:1.

Suitable SAN polymers as component B) are described above (cf. $B_{31}$ and $B_{32}$).

The viscosity number of the SAN polymers is generally from 40 to 100, preferably from 50 to 80, ml/g, measured according to DIN 53 727 as a 0.5% strength by weight solution in dimethylformamide at 23° C.

ABS polymers as polymers (B) in the novel molding materials have the same composition as described above for ASA polymers. Instead of the acrylate rubber $B_1$) of the grafting base in the ASA polymer, conjugated dienes are usually used, so that the grafting base $B_4$ preferably has the following composition:

$B_{41}$ from 70 to 100% by weight of a conjugated diene and $B_{42}$ from 0 to 30% by weight of a difunctional monomer having two olefinic nonconjugated double bonds.

Examples of conjugated dienes are 1,3-pentadiene, alkyl-substituted dienes such as 2,3-dimethylbutadiene, and conjugated hexadienes, heptadienes and octadienes and cyclic dienes, such as cyclopentadiene, butadiene and isoprene being preferred.

Grafting base $B_2$ and the hard matrix of the SAN copolymer $B_3$) remain unchanged in the composition. Such products are commercially available. The preparation processes are known to a person skilled in the art, and further information in this context is therefore unnecessary.

The weight ratio $(B_4+B_2):B_3$ is from 3:1 to 1:3, preferably from 2:1 to 1:2.

A further suitable polymer (B) in the novel molding materials is a polymer of a $C_1$–$C_{18}$-alkyl ester of (meth) acrylic acid or of a mixture thereof.

According to the invention, the $C_1$–$C_{18}$-alkyl esters, such as methyl, ethyl, n-propyl, isopropyl, n-butyl, isobutyl, sec-butyl, tert-butyl, pentyl, hexyl, heptyl, octyl, 2-ethylhexyl, nonyl, decyl, lauryl or stearyl acrylate, are used as $C_1$–$C_{18}$-alkyl esters of acrylic acid, preferably methyl acrylate, n-butyl acrylate and 2-ethylhexyl acrylate, as well as mixtures of these monomers.

According to the invention, the $C_1$–$C_{18}$-alkyl esters, such as methyl, ethyl, n-propyl, isopropyl, n-butyl, isobutyl, sec-butyl, tert-butyl, pentyl, hexyl, heptyl, octyl, 2-ethylhexyl, nonyl, decyl, lauryl or stearyl methacrylate, are used as $C_1$–$C_{18}$-alkyl esters of methacrylic acid, preferably methyl methacrylate, as well as mixtures of these monomers.

Up to 50, preferably from 1 to 20, % by weight of the following monomers mentioned by way of example may be used as further comonomers:

vinylaromatics, such as styrene, alpha-methylstyrene, vinyltoluene or p-tert-butylstyrene;

p-aminostyrene;

p-hydroxystyrene;

p-vinylbenzoic acid;

acrylic and methacrylic acid;

acrylamide and methacrylamide;

maleic acid and its imides and $C_{10}$–$C_{10}$-alkyl ester;

fumaric acid and its imides and $C_1$–$C_{10}$-alkyl ester;

itaconic acid and its imides and $C_1$–$C_{10}$-alkyl ester;

acrylonitrile and methacrylonitrile; hydroxyalkyl (meth)acrylates.

Polymers of 99% by weight of methyl methacrylate and 1% by weight of methyl acrylate, having a weight average molecular weight $(M_w)$ of from 60,000 to 300,000, in particular from 80,000 to 150,000, g/mol, have proven particularly advantageous.

Polymethyl methacrylate is generally prepared by known polymerization methods, such as mass, solution, emulsion or bead polymerization. Such processes are described, for example, in Kunststoffhandbuch, Vol. 9, Vieweg und Esser; Polymethylmethacrylat, Carl-Hanser-Verlag, Munich, 1975, page 36 et seq.

The novel molding materials contain, as component C), from 1 to 30, preferably from 2 to 20, in particular from 5 to 10, % by weight of an adhesion promoter which contains from 0.1 to 10, preferably from 0.1 to 1, % by weight, based on 100% by weight of C), of functional monomers. Modified ABS, SAN, ASA or (meth)acrylate-based polymers, as described above for component B), are used as component C). Modified SAN polymers which are described above as component B), are preferably used as compatibilizers (cf. $B_{31}$ and $B_{32}$).

The interphase adhesion of the two polymers A) and B) is further improved by the compatibilizer which is modified with functional monomers.

An unmodified ABS, SAN or ASA polymer or (meth) acrylate polymer (cf. component B) is usually modified by incorporating at least one carbonyl, carboxyl, anhydride, amido, imido, carboxylic ester, carboxylate, amino, hydroxyl, epoxy, oxazoline, urethane, urea, lactam, halobenzyl or 1,2,4-triazoline-3,5-dione group (functional monomers).

Suitable modifiers are, for example, maleic acid, methylmaleic acid, itaconic acid, tetrahydrophthalic acid, the anhydrides and imides thereof, fumaric acid, the mono- and diesters of these acids, for example with $C_1$- and $C_2$–$C_8$-alkanols, the mono- and di-amides of these acids, such as N-phenylmaleamide, and maleic hydrazide. Other examples are N-vinylpyrrolidone and (meth)acryloylcaprolactam. Another group of modifiers comprise, for example, the acyl chloride of trimellitic anhydride, 4-(methylcarbonyloxycarbonyl)-benzene-1,2-dicarboxylic anhydride, chloroethanoylsuccinaldehyde, chloroformylsuccinaldehyde, citric acid and hydroxysuccinic acid.

1,2,4-Triazoline-3,5-dione itself or 1,2,4-triazoline-3,5-dione substituted in the 4-position, of the formula I

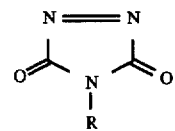

is a particularly preferred modifier. Here, R may be an alkyl, cycloalkyl, aryl, aralkyl or alkylaryl radical of up to 25 carbon atoms, a 5-membered to 8-membered heterocyclic structure containing nitrogen, oxygen or sulfur as the hetero atom or $NR^1R^2$, where $R^1$ and $R^2$ are each $C_1$–$C_4$-alkyl or in particular hydrogen.

The functional monomer can be introduced into the polymer chain either by copolymerization or grafting. Grafting can be carried out either in solution or in the melt, and, if required, free radical initiators, such as peroxides, hydroperoxides, peresters and percarbonates, may be present.

The novel molding materials may contain from 0 to 30, preferably from 0 to 20, in particular from 0 to 10, % by weight of an elastomeric polymer which differs from B) and C). Such polymers are often also referred to as impact-modifying polymers, impact modifiers, elastomers or rubbers.

The component D) has in general at least one elastomer phase whose softening temperature is less than −25° C., preferably less than −30° C.

Impact modifying polymers which increase the toughness of component A) are copolymers of ethylene with propylene and, if required, a conjugated diene (EP or EPDM rubbers), the ethylene content preferably being 45, in particular 50, % by weight (based on 100% by weight of the component D)).

Such impact modifiers are generally known, and reference may therefore be made to the publication by Cartasegna in Kautschuk, Gummi, Kunststoffe 399 (1986), 1186–1191, for further details.

Rubbers which increase the toughness of polyamides have, inter alia, two essential features: they contain an elastomeric fraction which has a glass transition temperature of less than −10, preferably less than −30, ° C. and they contain at least one functional group which can react with the polyamide. Suitable functional groups are, for example, carboxyl, carboxylic anhydride, carboxylic ester, carboxamido, carboximido, amino, hydroxyl, epoxy, urethane and oxazoline groups.

Examples of rubbers which increase the toughness of polyamides are

EP and EPDM rubbers which have been grafted with the abovementioned functional groups. Examples of suitable grafting reagents are maleic anhydride, itaconic acid, acrylic acid, glycidyl acrylate and glycidyl methacrylate. These monomers may be grafted onto the polymer in the melt or in solution, in the presence or absence of a free-radical initiator, eg. cumyl hydroperoxide.

Copolymers of α-olefins may also be mentioned. The α-olefins are usually monomers of 2 to 8 carbon atoms, preferably ethylene and propylene. Alkyl acrylates or alkyl methacrylates which are derived from alcohols of 1 to 8 carbon atoms, preferably from ethanol, butanol or ethylhexanol, and reactive comonomers, such as acrylic acid, methacrylic acid, maleic acid, maleic anhydride or glycidyl (meth)acrylate, and also vinyl esters, in particular vinyl acetate, have proven suitable comonomers. Mixtures of different comonomers may also be used. Copolymers of ethylene with ethyl or butyl acrylate and acrylic acid and/or maleic anhydride have proven particularly suitable.

The copolymers can be prepared by a high pressure process at from 400 to 4500 bar or by grafting the comonomers onto the poly-α-olefin. The amount of the a-olefin is in general from 99.95 to 55% by weight, based on the copolymer.

A further group of suitable elastomers comprises core-shell graft rubbers. These are graft rubbers which have been prepared in emulsion and consist of at least one hard and one soft component. A hard component is usually understood as meaning a polymer having a glass transition temperature of at least 25° C., and a soft component is understood as meaning a polymer having a glass transition temperature of not more than 0° C. These products have a structure comprising a core and at least one shell, the structure being determined by the order of addition of the monomers.

Preferred core-shell graft rubbers contain a soft core and a hard shell or a hard core, a first soft shell and at least one further hard shell. The weight ratio of soft to hard components is in general from 1:9 to 9:1, preferably from 3:7 to 8:2.

Such rubbers which increase the toughness of polyamides are known per se and are described, for example, in EP-A 208 187.

A further group of suitable impact modifiers comprises thermoplastic polyester elastomers. Polyester elastomers are understood as meaning segmented copolyether esters which contain long-chain segments derived as a rule from poly(alkylene) ether glycols and short-chain segments derived from low molecular weight diols and dicarboxylic acids. Such products are known per se and are described in the literature, for example in U.S. Pat. No. 3 651 015. Corresponding products are also commercially available under the names Hytrel® (Du Pont), Arnitel® (Akzo and Pelprene®).

Mixtures of different rubbers may of course also be used.

The novel molding materials may contain, as further component, from 0 to 45, preferably up to 35, % by weight of a fibrous or particulate filler (component E)) or of a mixture thereof.

Preferred fibrous reinforcing materials are carbon fibers, potassium titanate whiskers, aramid fibers and particularly preferably glass fibers. Where glass fibers are used, they may be provided with a size and an adhesion promoter in order to improve the compatibility with the thermoplastic polyamide (A). In general, the glass fibers used have a diameter of from 6 to 20 μm.

These glass fibers may be incorporated both in the form of short glass fibers and in the form of rovings. In the finished injection molded article, the average length of the glass fibers is preferably from 0.08 to 0.5 mm.

Suitable particulate fillers are amorphous silica, magnesium carbonate (chalk), kaolin (in particular calcined kaolin), powdered quartz, mica, talc, feldspar and in particular calcium silicates, such as wollastonite.

Preferred combinations of fillers are, for example, 20% by weight of glass fibers with 15% by weight of wollastonite and 15% by weight of glass fibers with 15% by weight of wollastonite.

In addition to the essential components A) to C) and, if required, D) and/or E), the novel molding materials may contain conventional additives and processing assistants F). Their amount is in general up to 30, preferably up to 15, % by weight, based on the total weight of components (A) to (F).

Conventional additives are, for example, stabilizers and antioxidants, heat stabilizers and UV stabilizers, lubricants and mold release agents, dyes and pigments and plasticizers.

Pigments and dyes are generally present in amounts of up to 4, preferably from 0.5 to 3.5, in particular from 0.5 to 3, % by weight.

The pigments for coloring thermoplastics are generally known, cf. for example R. Gächter and H. Müller, Taschenbuch der Kunststoffadditive, Carl Hanser Verlag, 1983, pages 494 to 510. A first preferred group of pigments comprises white pigments, such as zinc oxide, zinc sulfide, lead white (2 $PbCO_3.Pb(OH)_2$), lithopone, antimony white and titanium dioxide. Of the two most commonly used crystal modifications (rutile and anatase type) of titanium dioxide, the rutile form in particular is used for rendering novel molding materials white.

Black pigments which may be used according to the invention are iron oxide black ($Fe_3O_4$), spinel black (Cu(Cr, Fe)$_2$O$_4$), manganese black (mixture of manganese dioxide, silica and iron oxide), cobalt black and antimony black and particularly preferably carbon black, which is generally used in the form of furnace black or gas black (cf. G. Benzing, Pigmente für Anstrichmittel, Expert-Verlag (1988), page 78 et seq.).

According to the invention, it is of course possible to use inorganic colored pigments, such as chromium oxide green, or organic colored pigments, such as azo pigments and phthalocyanines, in order to obtain certain hues. Such pigments are generally commercially available.

It may also be advantageous to use the stated pigments or dyes as a mixture, for example carbon black with copper phthalocyanines, since the color dispersion in the thermoplastic is generally facilitated.

Antioxidants and heat stabilizers which may be added to the thermoplastic materials according to the invention are, for example, halides of metals of group I of the Periodic Table, for example sodium halides, potassium halides and lithium halides, if necessary in combination with copper(I) halides, for example chlorides, bromides or iodides. The halides, in particular of copper, may also contain electron-rich π ligands. Examples of such copper complexes are copper halide complexes with, for example, triphenylphosphine. Zinc fluoride and zinc chloride may also be used. Furthermore, sterically hindered phenols, hydroquinones, substituted members of these groups, secondary aromatic amines, if necessary in combination with phosphorus-containing acids or salts thereof, and mixtures of these compounds may be used, preferably in concentrations of up to 1% by weight, based on the weight of the mixture.

Examples of UV stabilizers are various substituted resorcinols, salicylates, benzotriazoles and benzophenones, which are generally used in amounts of up to 2% by weight.

Lubricants and mold release agents, which as a rule are added in amounts of up to 1% by weight of the thermoplastic material, are stearic acid, stearyl alcohol, alkyl stearates and stearamides and esters of pentaerythritol with long-chain fatty acids. Salts of calcium, zinc or aluminum with stearic acid and dialkyl ketones, eg. distearyl ketone, may also be used.

The additives include stabilizers which prevent the decomposition of the red phosphorus in the presence of moisture and atmospheric oxygen. Examples are compounds of cadmium, of zinc, of aluminum, of tin, of magnesium, of manganese and of titanium. Particularly suitable compounds are, for example, oxides of the stated metals, as well as carbonates or basic carbonates, hydroxides and salts of organic or inorganic acids, such as acetates or phosphates or hydrogen phosphates.

Only red phosphorus and the other flameproofing agents known per se for polyamides are mentioned here as flameproofing agents.

The novel thermoplastic molding materials can be prepared by processes known per se, by mixing the starting components in a conventional mixing apparatus, such as an extruder, a Brabender mill or a Banbury mill, and then carrying out extrusion. After the extrusion, the extrudate is cooled and comminuted.

The novel molding materials possess good multiaxial impact strength in combination with good joint line strength. In particular, they can be readily processed by a thermoplastic method and accordingly are suitable for the production of fibers, films and moldings, in particular moldings having complex geometries.

EXAMPLES

Component A)

An about 60% strength aqueous solution consisting of terephthalic acid (32.2 mol % $\hat{=}$37.5% by weight), isophthalic acid (17.8 mol% $\hat{=}$20.6% by weight), hexamethylenediamine (48.1 mol% $\hat{=}$39.1% by weight or 1.9 mol% $\hat{=}$2.8% by weight), bis(4-aminocyclohexyl)methane and 0.174 kg of propionic acid in 100 kg of water was conveyed from a heated storage container at about 80° C. at a rate corresponding to 5 kg/hour of polyamide by means of a metering pump into a tubular evaporator arranged partly horizontally and partly vertically. The evaporator was heated by means of a liquid heating medium which was at 326° C., with vigorous circulation. The evaporator had a length of 3 m, a capacity of 180 ml and a heat-transfer surface area of about 1300 cm$^2$. The residence time in the evaporator was 50 seconds. The mixture of prepolymers and steam emerging from the evaporator was at 310° C. and was separated into steam and melt in a separator. The melt remained in the separator for a further 10 minutes and was then discharged by means of a discharge screw having a devolatilization zone in the form of extrudates, solidified in a waterbath and then granulated. The separator and the evaporator zone were kept at 5 bar by a pressure regulation means which was arranged downstream of the column. The steam separated off in the separator was fed to a packed column which had about 10 theoretical plates and to the top of which about 1 l of vapor condensate per hour was added in order to generate a reflux. The resulting temperature at the top of the column was 152° C. The steam emerging after the let-down valve was condensed and contained less than 0.05% by weight of hexamethylenediamine. The bottom product of the column was an aqueous solution of hexamethylenediamine, which contained 80% by weight, based in each case on polyamide produced, of hexamethylenediamine. This solution was added to the starting salt solution by means of a pump, once again upstream of the entry into the evaporator.

After the polymer melt had emerged from the separator, the polyamide had a very light natural color and a viscosity number of 48 ml/g (measured as 0.5% strength solution at 25° C. in 96% strength by weight H$_2$SO$_4$ according to DIN 53 246).

The product had roughly equivalent amounts of carboxyl and amino terminal groups.

In the discharge extruder, the melt was let down to atmospheric pressure and underwent virtually no further condensation during a residence time of less than 1 minute.

The product was then heated batchwise in the solid phase in a stationary heating tube (double-walled glass tube which was heated from the outside with oil to the required temperature, had an internal diameter of 120 mm and a length of 1000 mm and through which 120 l/min of superheated steam flowed) at 200° C. until the viscosity number reached 112 ml/g. The residence time was 23 hours. In the course of this heating, a large part of the extractable residual monomers was, if required, also extracted from the steam.

Composition a$_1$) 32.2 mol % or 37.5% by weight
a$_2$) 17.8 mol % or 20.6% by weight
a$_3$) 48.1 mol % or 39.1% by weight
a$_4$) 1.9 mol % or 2.8% by weight The specific heat of fusion $\Delta H_{cryst}$ was determined by means of Differential Scanning Calorimetry (DSC 990 from Du Pont) at a heating rate of 20° C./min, as a relative measure of the crystallinity: 54 J/g.

Component A/1V

Poly-ε-caprolactam (Ultramid® B3 from BASF AG) having a VN (viscosity number) of 150 ml/g; $\Delta H_{cryst}$: 75 J/g.

Component B/1

An ABS polymer (Terluran® 967K from BASF AG), obtainable according to Example 1 of DE-A 24 27 960:

The following products were initially taken in a V2A stainless steel kettle designed for 10 atm (gauge pressure) and equipped with a paddle stirrer:

150 parts of water, 1.2 parts of the sodium salt of a paraffinsulfonic acid ($C_{12}$–$C_{18}$), 0.3 part of potassium persulfate, 0.3 part of sodium bicarbonate and 0.15 part of sodium pyrophosphate.

In order to remove the oxygen, the kettle was flushed twice with nitrogen and the solution was heated to 65° C. 0.5 part of tert-dodecyl mercaptan and 16.6 parts of butadiene were then added to the solution. One hour after the beginning of the polymerization, a further 83.3 parts of butadiene were metered in over 5 hours. Five hours after the end of the butadiene addition, ie. after a total of 11 hours, a further 0.5 part of tert-dodecyl mercaptan was added. After the total reaction time of 19 hours, a polybutadiene emulsion having a solids content of 39.2%, based on the emulsion, was obtained at a conversion of 96%. The polybutadiene latex had a glass transition temperature of about –80° C. The particle size distribution (integral mass distribution) determined by means of the ultracentrifuge is characterized by the following values:

$d_{10}$ value 0.06 μm $d_{50}$ value 0.08 μm $d_{90}$ value 0.105 μm 255 parts of the polybutadiene emulsion were diluted with 74 parts of water at 65° C. 30 parts of an aqueous dispersion of an ethyl acrylate copolymer which contained 96% by weight of ethyl acrylate and 4% by weight of methylacrylamide as polymerized units were metered in for agglomerating the latex. The solids content of this dispersion was 10% by weight, based on the dispersion. After the agglomeration, a polybutadiene latex in which about 80 percent of the particles were in the non-agglomerated state was obtained. The particle size distribution (integral mass distribution), measured using an ultracentrifuge, of the agglomerated poybutadiene latex is characterized by the following values:

$d_{10}$ value 0.079 μm $d_{50}$ value 0.238 μm $d_{90}$ value 0.323 μm

The polybutadiene emulsion thus obtained was heated to 70° C., and 0.13 part of potassium persulfate (in the form of a 3 percent strength aqueous solution), 0.02 part of tert-dodecyl mercaptan and 11 parts of a mixture of styrene and acrylonitrile were added at this temperature. The weight ratio of styrene to acrylonitrile in this mixture was 7:3. Ten minutes after the beginning of the grafting reaction, a mixture of a further 39 parts of styrene, 17 parts of acrylonitrile and 0.1 part of tert-dodecyl mercaptan was metered in over 2 ¾ hours. A reaction temperature of 75° C. was thereby established. After the end of the monomer addition, the reaction was continued for a further hour and the resulting graft polymer was then precipitated by means of a calcium chloride solution at 95° C. and was filtered off with suction. The moist crumbs of the graft polybutadiene were incorporated by means of an extruder into the melt of a styrene/acrylonitrile copolymer which contained 65% by weight of styrene and 35% by weight of acrylonitrile as polymerized units. The grafted poly-butadiene was mixed with the styrene/acrylonitrile copolymer in a weight ratio of 3:7.

Component B/2

An ASA polymer (Luran® S 778T from BASF AG) obtainable according to DE-A 12 60 135 (comparative example 1a)

100 parts of butyl acrylate, 50 parts of emulsifier H (20% strength), 3 parts of potassium persulfate and 1480 parts of distilled water were heated to 60° C. while stirring. After initiation of the polymerization, 880 parts of butyl acrylate and 20 parts of butanediol diacrylate were metered in over about 1 hour. Polymerization was carried out for a further 2 hours, and a polymer emulsion (A) of about 40% strength was obtained.

465 parts of styrene and 200 parts of acrylonitrile were polymerized in the presence of 2500 parts of the emulsion (A), 2 parts of potassium persulfate, 1.33 parts of lauryl peroxide and 1005 parts of distilled water while stirring at 60° C. The result was a 40% strength emulsion, from which the solid product was precipitated by adding 0.5% strength calcium chloride solution and was washed with water and dried.

1490 parts of the dried polymer were mixed with 2090 parts of a copolymer of 68 parts of styrene and 32 parts of acrylonitrile at ~220° C. in an extruder.

Component C/1

An SAN copolymer:

75% by weight of styrene 24.5% by weight of acrylonitrile 0.5% by weight of maleic anhydride VN=80 ml/g (according to DIN 53 727, measured as a 0.5% strength solution in dimethylformamide at 23° C.)

Component C/2

An SAN copolymer:

75% by weight of styrene

21% by weight of acrylonitrile

4% by weight of maleic anhydride

VN=78 ml/g (according to DIN 53 727, see component C/1)

Component D

An ethylene/n-butyl acrylate/acrylic acid/maleic anhydride copolymer in a weight ratio of 60:35:4.8:0.2.

Preparation of the molding materials

The amounts of the particular components stated in the table are compounded in a twin-screw extruder (ZSK 30, Werner & Pfleiderer) in a conventional manner at 325° C. The polymer melt was devolatilized, extruded, passed through a waterbath, granulated and dried. The granules were then processed at 325° C. on an injection molding machine to give standard test specimens.

Material test

1) Total penetration energy (W)-DIN 53 443

3) Joint line strength ($\sigma_B$)

The joint line strength was determined using tensile test rods (170×20×4 mm) injected from the two end points, by carrying out a tensile test according to ISO 527. The elongation at break $\sigma_B$ determined serves as a measure of the joint line strength.

The compositions of the molding materials and the results of the measurements are shown in the table.

TABLE

| Examples | Component A [% by weight] | Component B [% by weight] | Component C [% by weight] | Component D [% by weight] | W [Nm] | $\delta_B$ [N/mm$^2$] |
|---|---|---|---|---|---|---|
| 1 | A/1 60 | B/1 30 | C/1 10 | — | 62 | 53 |
| 2 | A/1 60 | B/2 30 | C/1 10 | — | 56 | 51 |
| 3 | A/1 60 | B/1 35 | C/2 5 | — | 63 | 50 |
| 4 | A/1 60 | B/2 35 | C/2 5 | — | 59 | 48 |
| 5 | A/IV 55 | B/1 35 | C/2 5 | D 5 | 69 | 45 |
| 1* | A/IV 60 | B/1 30 | C/1 10 | — | 45 | 29 |
| 2* | A/IV 55 | B/1 35 | C/2 5 | D 5 | 48 | 26 |

We claim:

1. A thermoplastic molding composition comprising

A) from 5 to 94% by weight of a partly aromatic, semicrystalline copolyamide composed essentially of
 $a_1$) from 30 to 44 mol % of units which are derived from terephthalic acid,
 $a_2$) from 6 to 20 mol % of units which are derived from isophthalic acid,
 $a_3$) from 43 to 49.5 mol % of units which are derived from hexamethylenediamine, and
 $a_4$) from 0.5 to 7 mol % of units which are derived from aliphatic cyclic diamines of 6 to 30 carbon atoms,
the molar percentages of components $a_1$) to $a_4$) together giving 100% and B) from 5 to 94% by weight of an ASA or ABS or SAN polymer or of a $C_1$–$C_{18}$-alkyl ester of (meth)acrylic acid or of a mixture thereof, C) from 1 to 30% by weight of an adhesion promoter which contains from 0.1 to 10% by weight, based on 100% by weight of (C), of functional monomers, D) from 0 to 30% by weight of an elastomeric polymer, E) from 0 to 45% by weight of a fibrous or particulate filler or of a mixture thereof, and F) from 0 to 30% by weight of conventional additives and processing assistants, the percentages A) to F) summing to 100%.

2. The thermoplastic molding composition as defined in claim 1, comprising:

A) from 10 to 90% by weight
B) from 5 to 60% by weight
C) from 2 to 20% by weight
D) from 0 to 20% by weight
E) from 0 to 35% by weight
F) from 0 to 30% by weight.

3. The thermoplastic molding composition as defined in claim 1, in which the copolyamide A) is comprises from 32 to 40 mol % of $a_1$),
from 10 to 18 mol % of $a_2$),
from 46 to 48.5 mol % of $a_3$) and
from 0.5 to 4 mol % of $a_4$).

4. The thermoplastic molding composition as defined in claim 1, in which the copolyamide A) has a triamine content of less than 0.5% by weight.

5. The thermoplastic molding composition as defined in claim 1, in which the aliphatic cyclic diamine $a_4$) is bis(4-aminocyclohexyl)methane or
bis(4-amino-3-methylcyclohexyl)methane or a mixture thereof.

6. The thermoplastic molding composition as defined in claim 1, in which the copolyamide A) has a crystallinity greater than 30%.

7. The thermoplastic molding composition as defined in claim 1, in which the component C) comprises at least one carbonyl, carboxyl, anhydride, amido, imido, carboxylic ester, carboxylate, amino, hydroxyl, epoxy, oxazoline, urethane, urea, lactam, halobenzyl or 1,2,4-triazoline-3,5-dione group as functional monomer.

8. An article obtained from a molding composition as defined in claim 1.

* * * * *